United States Patent
Kitazawa et al.

[11] Patent Number: 5,848,312
[45] Date of Patent: Dec. 8, 1998

[54] CAMERA WITH BUILT-IN STROBE

[75] Inventors: Toshiyuki Kitazawa; Tomoaki Itabashi, both of Tokyo, Japan

[73] Assignee: Asahi Kogaku Kogyo Kabushiki Kaisha, Tokyo, Japan

[21] Appl. No.: 944,318

[22] Filed: Sep. 14, 1992

[30] Foreign Application Priority Data

Sep. 12, 1991 [JP] Japan ................................. 3-308605

[51] Int. Cl.⁶ ............................................. G03B 17/02
[52] U.S. Cl. ............................................. 396/535; 396/542
[58] Field of Search .................... 354/149.11, 126, 354/145.1, 173.1, 173.11; 396/535, 542

[56] References Cited

U.S. PATENT DOCUMENTS

| | | |
|---|---|---|
| 4,227,788 | 10/1980 | Shimizu et al. . |
| 4,544,251 | 10/1985 | Haraguchi et al. . |
| 4,711,548 | 12/1987 | Arakawa et al. . |
| 4,896,178 | 1/1990 | Ohmura et al. ............ 354/145.1 |
| 4,945,368 | 7/1990 | Ishino et al. ............ 354/149.11 |
| 4,954,859 | 9/1990 | Kitazawa . |
| 4,969,000 | 11/1990 | Ohara et al. ............ 354/173.1 |
| 4,996,544 | 2/1991 | Fiorda ............ 354/173.1 |
| 5,001,505 | 3/1991 | Tosaka et al. ............ 354/173.1 |
| 5,036,343 | 7/1991 | Yamanaka ............ 354/145.1 |
| 5,136,760 | 8/1992 | Sano et al. . |
| 5,150,140 | 9/1992 | Kitazawa . |

FOREIGN PATENT DOCUMENTS

| | | |
|---|---|---|
| 2302741 | 12/1990 | Japan . |
| 1313588 | 4/1973 | United Kingdom . |
| 2235056 | 2/1991 | United Kingdom . |
| 2244563 | 12/1991 | United Kingdom . |

OTHER PUBLICATIONS

Patent Abstracts of Japan, vol. 15, No. 87 (P1173) Feb. 28, 1991.

*Primary Examiner*—David M. Gray
*Attorney, Agent, or Firm*—Greenblum & Bernstein P.L.C.

[57] ABSTRACT

A camera with a built-in strobe includes a camera body and a camera grip provided in the camera body. In the grip, a battery, a spool and a main strobe capacitor are provided. An elongated space, with extends in the camera grip along the longitudinal direction thereof, is defined so as to be surrounded by the battery, the spool and the main strobe capacitor. A strobe circuit board is roughly formed into an L-shape so as to have a cutout portion, and a motor is arranged in the cut-out portion of the strobe circuit board. As a result, the motor and the circuit board can be housed effectively within the smallest possible space within the camera grip. Further, by this arrangement, it becomes possible to realize a small-sized camera provided with a built-in strobe.

13 Claims, 10 Drawing Sheets

CAMERA WITH BUILT-IN STROBE

BACKGROUND OF THE INVENTION

1. Field of the Invention

This invention relates to a camera provided with a built-in stroboscope (hereinafter referred to as "strobe"), and, more specifically, to an improvement of the arrangement of a motor and a strobe circuit within a camera body.

2. Description of the Prior Art

In a camera provided with a built-in strobe, a high voltage and a large current must be generated from a strobe circuit, and therefore electric noise is likely to be generated from the circuit. To prevent noise from being generated from the circuit without reducing the circuit efficiency, it has been known that it is preferable that a battery and a main strobe capacitor are arranged in the vicinity of the strobe circuit and, additionally a motor is disposed near the battery and a DC-DC converter of the strobe circuit.

In the above-mentioned arrangement, however, there exists a problem in that a complicated circuit design is required depending on the arrangements of various elements, and further the size of the circuit unavoidably increases.

SUMMARY OF THE INVENTION

With these problems in mind, therefore, it is a primary object of the present invention to provide a camera with a built-in strobe, in which a motor and a strobe circuit formed on a strobe circuit board are both arranged effectively with respect to each other, without increasing the size of the camera.

To achieve the above-mentioned object, a camera provided with a built-in strobe according to the present invention comprises a strobe circuit board roughly formed into an L-shape so as to have a cutout portion, and a motor arranged in the cutout portion formed in the strobe circuit board.

In the camera provided with a built-in strobe according to the present invention, since the strobe circuit board is roughly formed into an L-shape so as to have the cutout portion, and the motor is positioned within this cutout portion of the strobe circuit board, it is possible to effectively utilize a small space within a camera body by combining the motor and the strobe circuit board in complementary positional relationship with respect to each other in three-dimensional space, thus realizing a small-sized camera with a built-in strobe.

Further, according to the present invention, there is provided a camera with a built-in strobe which comprises a camera body and a camera grip provided in the camera body. In the camera grip, a battery, a spool and a main strobe capacitor are provided, in which an elongated space which extends in the camera grip along the longitudinal direction thereof is defined so as to be surrounded by the battery, the spool and the main strobe capacitor. A strobe circuit board roughly formed into an L-shape so as to have a cutout portion and a film winding and rewinding motor arranged in the cutout portion formed in the strobe circuit board are arranged within the space in the camera grip.

BRIEF DESCRIPTION OF THE DRAWINGS

FIGS. 5A to 5C are enlarged plane views for assistance in explaining the movements of various elements of the shutter and mirror charge mechanism according to the present invention, in which FIG. 5A shows the status obtained before a shutter button is released; FIG. 5B shows the status obtained after the shutter button has been released and the mirror charge is almost completed; and FIG. 5C shows the status obtained after the shutter button has been released and the shutter charge is almost completed; and FIGS. 6A to 6C are enlarged plane views for assistance in explaining the movements of various elements of a diaphragm control mechanism according to the present invention, in which FIG. 6A shows the status obtained before the shutter button is released and the diaphragm is reset open; FIG. 6B shows the status obtained after the shutter button has been released and the diaphragm has been set; and FIG. 6C shows the status obtained after the shutter button has been released and the diaphragm is almost reset open for initialization, respectively.

DETAILED DESCRIPTION OF THE PREFERRED EMBODIMENTS

An embodiment of the present invention will be described hereinbelow with reference to the attached drawings, in which the present invention is applied to a single-lens reflex camera with a built-in strobe of such a type that photometry starts when the shutter button is depressed half stroke and the shutter is released when depressed full.

Figure 1:
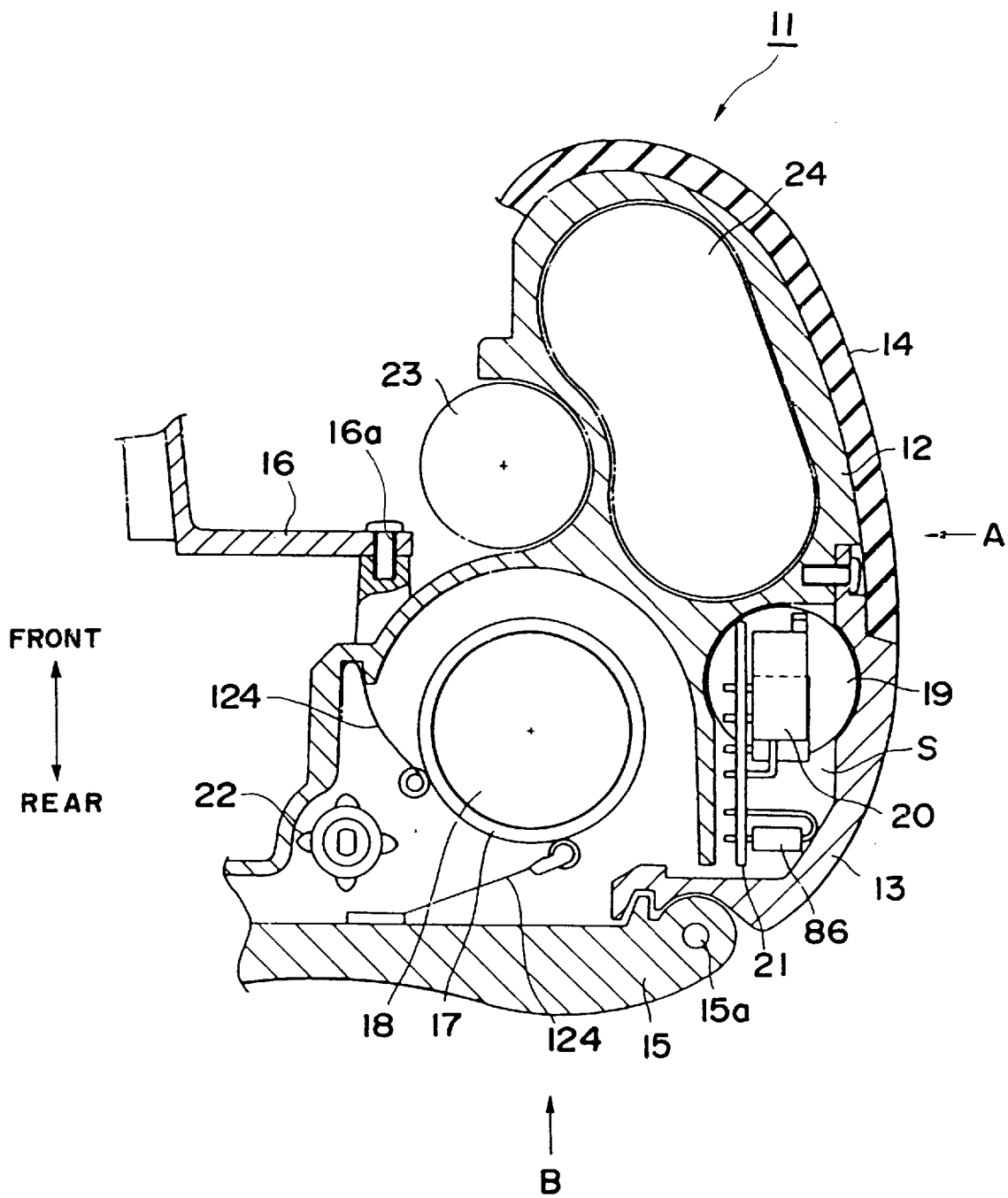
FIG. 1 is a horizontal cross-sectional view showing a camera grip according to the present invention, in which a battery, a charge motor, a strobe capacitor, a film motor, and a strobe circuit board are arranged.

FIG. 1 is a cross-sectional view taken along the horizontal plane of a camera grip 11 provided for a camera body 12. The camera grip 11 includes a grip rubber 14 disposed on the forward portion of the camera, a side cover 13 disposed on the rearward side portion of the camera, and a rear lid 15 disposed on the rearward portion of the camera so as to be pivoted about a pivotal shaft 15a. Within the camera grip 11, there are arranged a spool 17, a charge motor 18 housed in the spool 17, a film motor 19, strobe circuit elements 20, a strobe circuit board 21, a sprocket 22, a main strobe capacitor 23, and a battery 24. The film motor 19, the circuit board 21, the sprocket 22 and the battery 24 are all arranged around the spool 17 in the vertical direction of the camera grip 11. Further, a front plate 16 is fixed to the camera body 12 by a screw 16a. Furthermore, the reference numerals 124 denote two leaf springs for pushing a film wound around the spool 17, respectively.

As shown in FIG. 1, the strobe circuit board 21 and the film motor 19 are housed within a small space S enclosed by the battery 24, the side cover 13, and the spool 17.

Figure 2:
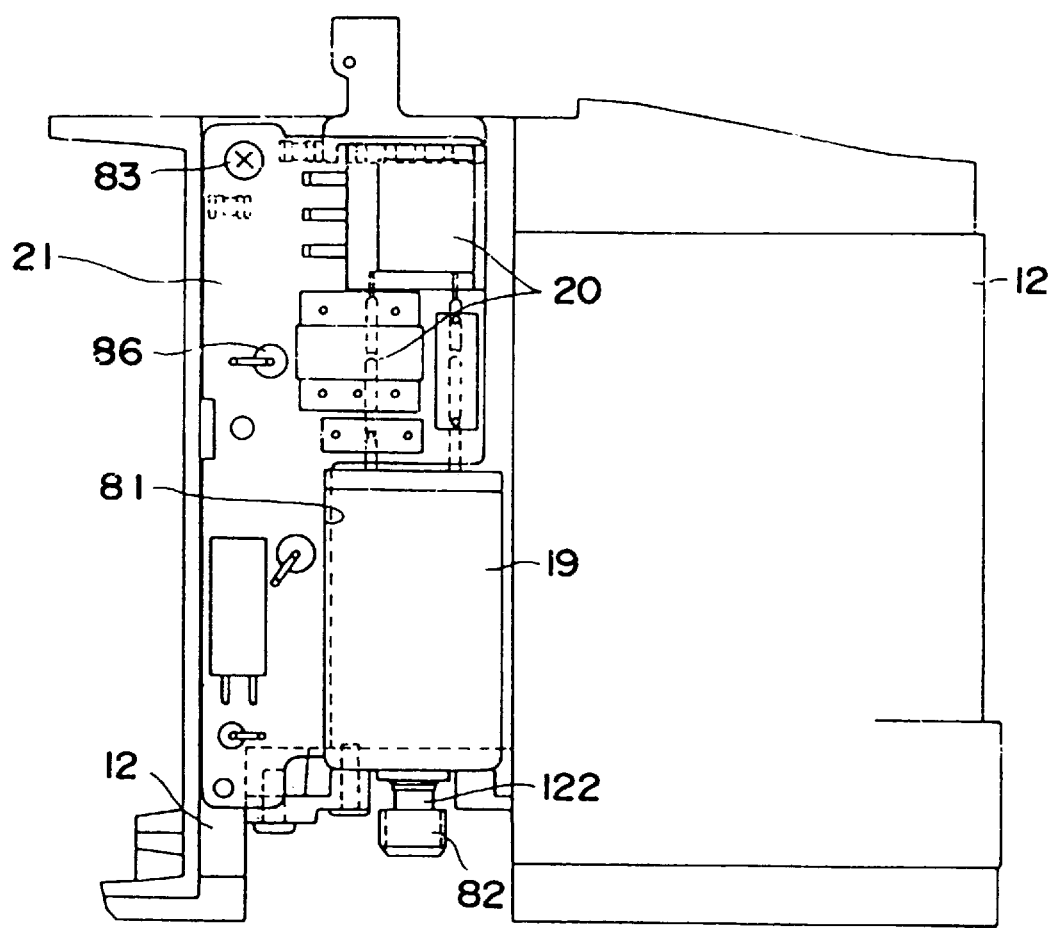
FIG. 2 is a side view showing the film motor and the strobe circuit board, obtained when seen from the arrow direction A in FIG. 1.

FIG. 2 is a side view obtained when seen from the arrow direction A shown in FIG. 1. As depicted in FIG. 2, the strobe circuit board 21, fixed to the camera body 12 by a screw 83, is roughly formed into an L-shape, which can be obtained by cutting off a cutout portion 81 from a rectangular circuit board. The longitudinal dimension of this cutout portion 81 of the strobe circuit board 21 is roughly equal to the axial dimension of a rotary shaft 122 of the film motor 19. Therefore, when the film motor 19 is arranged in the close vicinity to the cutout portion 81 of the strobe circuit board 21 by directing the rotary shaft 122 thereof along the longitudinal direction of the board 21, it is possible to effectively combine the strobe circuit board 21 and the film motor 19, in complementary positional relationship with respect to each other in three-dimensional space, so as to provide a box shape as a whole. In other words, the circuit board 21 and the motor 19 can be housed effectively within the smallest possible space S in the camera grip 11, as shown in FIG. 1.

In addition, the strobe circuit elements 20 such as a resistor 86, and others (e.g., transistors, capacitors, transformers) can be positioned on the strobe circuit board 21 so as to be arranged side by side with the film motor 19 along the longitudinal direction of the circuit board 21. This arrangement also contributes to minimize the space S enclosed by the battery 24 and the spool 17 within the camera grip 11.

Accordingly, in the camera with a strobe according to the present invention, it is possible to house the strobe circuit board 21 and the film motor 19 effectively within the smallest space S formed within the camera grip 11.

Hereinbelow, a shutter and mirror charging mechanism and a film winding and rewinding mechanism of the camera, which are arranged around the strobe circuit board 21 in the limited small space within the camera body so as to cooperate with the film motor 19, will be described in more detail with reference to the attached drawings.

Figure 3:
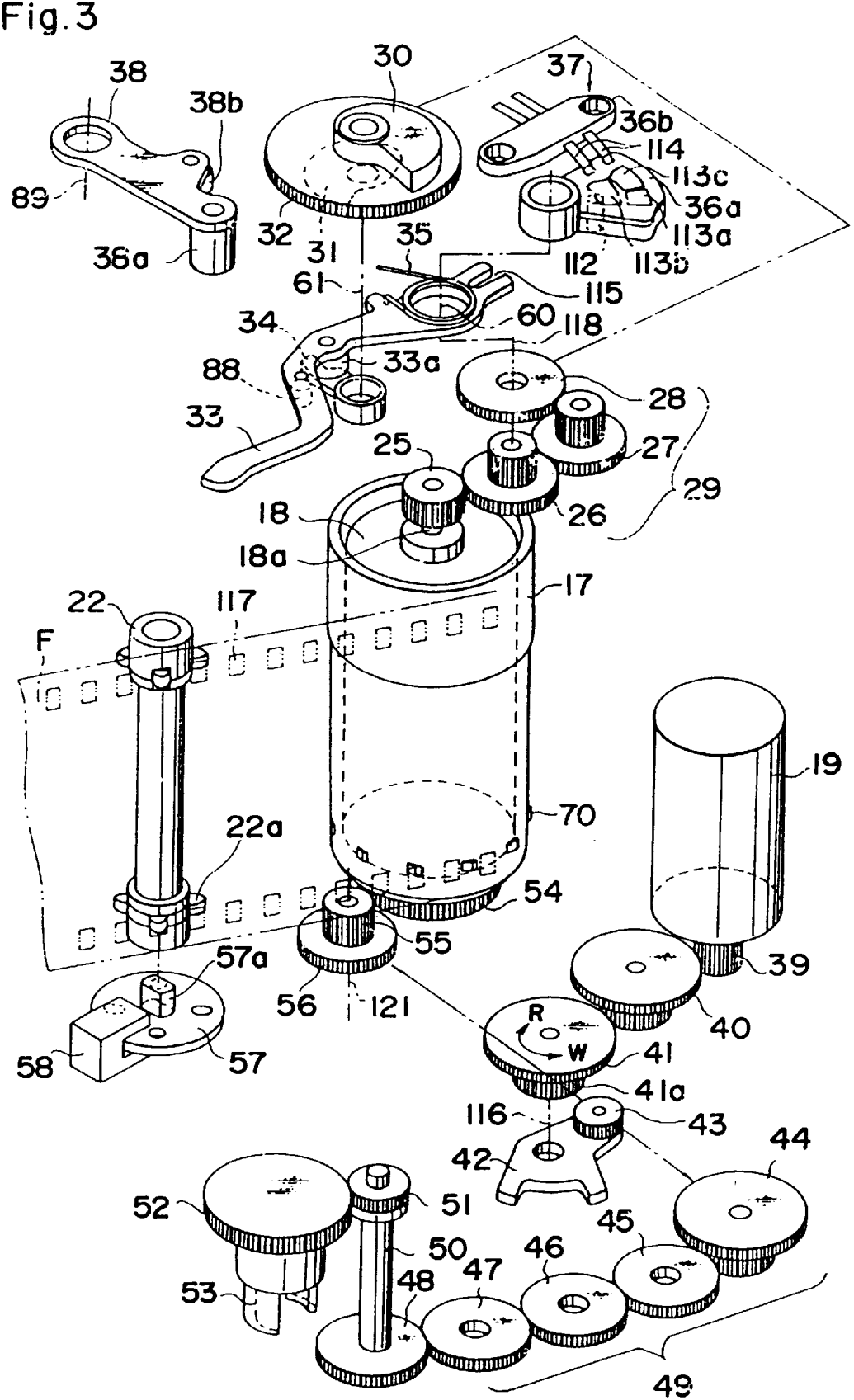
FIG. 3 is a perspective and partially exploded view showing a shatter and mirror charge mechanism and a film winding and rewinding mechanism of the camera according to the present invention.

FIG. 3 is a perspective view showing these mechanisms both arranged around the spool 17. The shutter and mirror charging mechanism roughly comprises a charge motor 18, a reduction gear train 29, a shutter cam 30, a mirror cam 31, a shutter charge lever 38, a mirror charge lever 33, and a rotary switch 37.

The charge motor 18 housed within the spool 17 drives the reduction gear train 29. That is, a pinion gear 25 is fixed to a rotary shaft 18a of the charge motor 18. The pinion gear 25 is in mesh with the reduction gear train 29 composed of gears 26, 27 and 28. The gear train 29 drives a cam gear 32 around an axis 61. The shutter cam 30 and the mirror cam 31 are fixed to this cam gear 32, as shown. Further, a diaphragm reset lever 34 is pivotally supported around the axis 61.

The cam gear 32 is located substantially at the middle portion of the mirror charge lever 33. This mirror charge lever 33 is pivotally supported about another axis 60. The shutter cam 30 is formed with an involute cam surface 30a having a diameter that gradually increases in a clockwise direction and a straight back portion 30b, as more clearly shown in FIG. 5A. The mirror cam 31 is formed with a first cam surface 31a with the largest diameter, a second cam surface 31b with a diameter smaller than that of the first cam surface 31a, and a back portion 31c, also as more clearly shown in FIG. 5A.

The mirror charge lever 33 pivotally supported about the axis 60 is urged in the counterclockwise direction by a coil spring 35. A roller pin 33a and a linkage pin 88 are both pivotably supported at the middle portion of the mirror charge lever 33, and are spaced at a predetermined interval. When the roller pin 33a is urged by the mirror cam 31 pivoted counterclockwise, the mirror charge lever 33 is pivoted clockwise around the axis 60. In this case, a free end of the pivoted mirror charge lever 33 can shift a mirror linkage lever 90 (shown in FIG. 5A) from a position shown by two-dot chain lines (mirror-up status after release) to another position shown by solid lines (mirror-down status after mirror charge completion).

The diaphragm reset lever 34 is urged in the counterclockwise direction by a spring (not shown) and always brought into contact with the linkage pin 88. When the mirror charge lever 33 is pivoted clockwise by the mirror cam 31 via the roller pin 33a, the diaphragm reset lever 34 is also pivoted clockwise about the axis 61 since the linkage pin 88 is also pivoted clockwise. As a result, a diaphragm latch lever 87 (shown in FIG. 5A) is shifted from a position shown by two-dot chain lines (diaphragm set closed status after release) to another position shown by solid lines (diaphragm reset open status before release). This condition is shown in FIG. 5C.

Figure 5A:
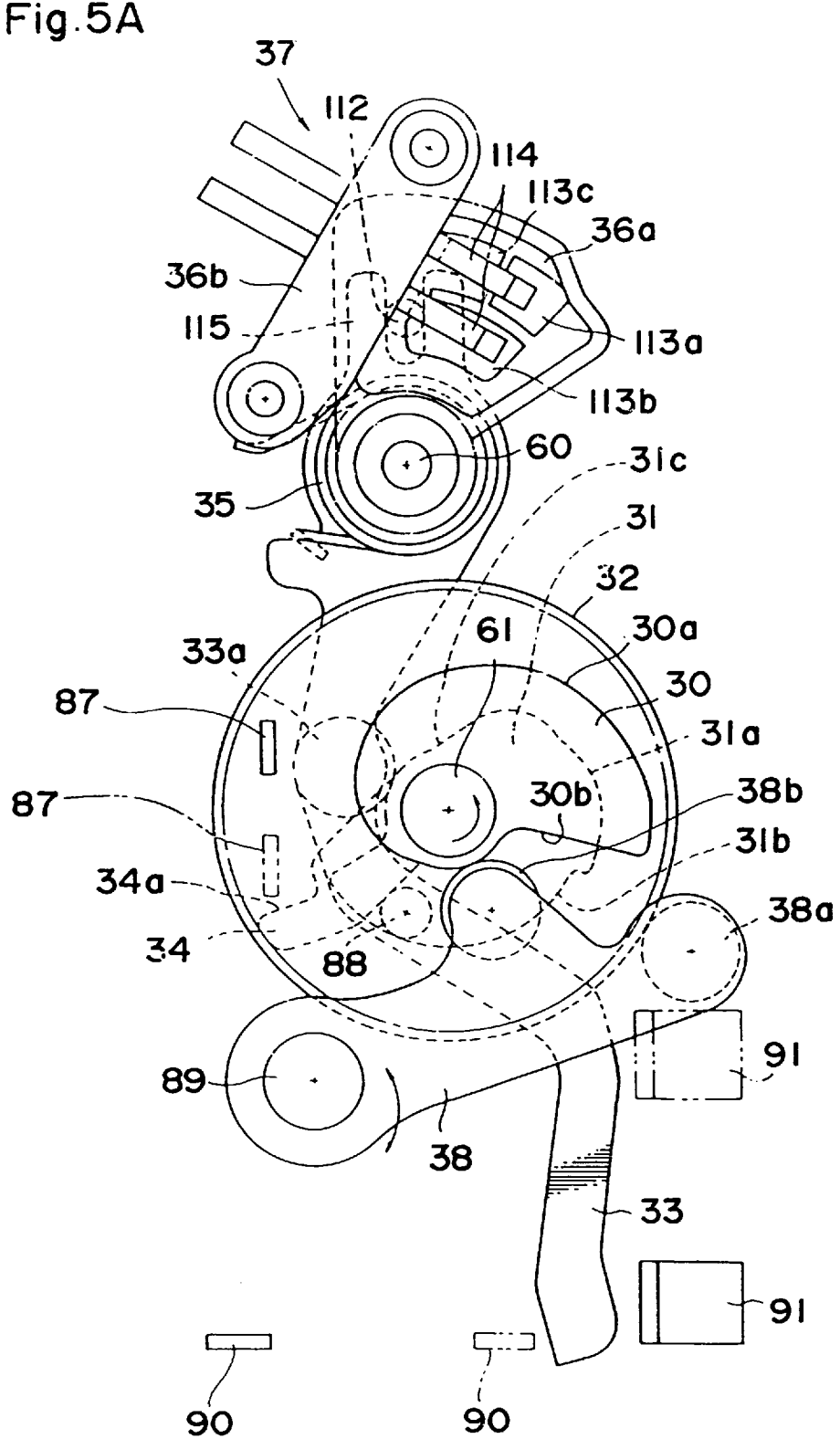

The shutter charge lever 38 is pivotally supported by a pivotal axis 89 and urged in the counterclockwise direction by a spring (not shown in FIG. 5A). This shutter charge lever 38 is provided with a charge pin 38a at the free end thereof and a roller pin 38b at the middle portion thereof. The roller pin 38b is in contact with the shutter cam 30. Therefore, when the shutter cam 30 is pivoted counterclockwise, the shutter charge lever 38 is pivoted clockwise about the axis 89 via the roller pin 38b to shift a shutter side charge lever 91 (shown in FIG. 5A) via the charge pin 38a from a position shown by two-dot chain lines (shutter release) to another position shown by solid lines (shutter charge completion).

The rotary switch 37 serves to detect the pivotal motion of the cam gear 32, that is, the pivotal motion of the mirror charge lever 33. The switch 37 includes a pivotal switch board 36a and a fixed switch member 36b. The pivotal switch board 36a, pivotally supported about the axis 60, is formed with a separate contact 113a and two mutually-connected contacts 113b and 113c, and provided with a downward extending linkage pin 112 engaged with a bifurcated portion 115 of the mirror charge lever 33. The fixed switch member 36b fixed to the camera body 12 includes two arcuate contact brushes 114 contactable with the contacts 113a, 113b and 113c of the switch board 36a, respectively when the switch board 36a is pivoted or not pivoted around the axis 60, respectively.

The film winding and rewinding mechanism, described hereinbelow with reference to FIG. 3, is mainly composed of the film motor 19, a planetary gear assembly 41 and 43, and a rewinding reduction gear train 49.

A pinion gear 39 attached to a rotary shaft of the film motor 19 is in mesh with a gear 40. This gear 40 is geared with a sun gear 41 rotatable around an axis 116. A pivotal planetary lever 42 is also disposed coaxially with the sun gear 41. A planetary gear 43 for meshing with a small diameter gear 41a of the sun gear 41 is rotatably supported on the planetary lever 42.

Further, the rewinding reduction gear train 49 composed of gears 44, 45, 46 and 47 is arranged near the planetary gear 43. This gear train 49 is in mesh with a lower through shaft gear 48 attached to a lower end of a through shaft 50. An upper through shaft gear 51 attached to an upper end of the through shaft 50 is in mesh with a rewinding gear 52 fixed to a rewinding fork 53.

In the same way, two coaxial gears composed of a small diameter gear 55 and a large diameter gear 56 are rotatably supported about another axis 121 near the planetary gear 43. This small gear 55 is in mesh with a winding gear 54 formed in the outer circumference of the lower end of the spool 17.

Therefore, when the film motor 19 rotates counterclockwise, and therefore the planetary lever 42 is pivoted counterclockwise by the sun gear 41 rotating counterclockwise via the planetary gear 43, a rotative force of the film motor 19 is transmitted to the spool 17 via the small diameter gear 55 and the winding gear 54 since the planetary gear 43 is brought into engagement with the large diameter gear 56. As a result, the spool 19 is rotated in the counterclockwise direction, so that a film is wound around the spool 17.

On the other hand, when the film motor 19 rotates clockwise and therefore the planetary lever 42 is pivoted clockwise by the sun gear 41 rotating clockwise via the planetary gear 43, another rotative force of the film motor 19 is transmitted to the rewinding fork 53 via the rewinding reduction gear train 49, the through shaft gears 48 and 51, and the rewinding gear 52, since the planetary gear 43 is brought into engagement with the gear 44. As a result, the rewinding fork 53 is rotated in the clockwise direction so that the film once wound around the spool 17 is rewound around another spool (not shown).

In the vicinity of the spool 17, a sprocket 22 is disposed in such a way that sprocket teeth 22a thereof are engaged with perforations 117 formed in the film F so as to be rotated when the film F is wound or rewound. Further, a rotary plate 57 is disposed under the sprocket 22 and engaged with the sprocket 22 by inserting an oval projection 57a into a central bore of the sprocket 22. Further, a photointerrupter 58 is associated with this rotary plate 57 to detect the number of rotations of the rotary plate 57, that is, to measure the winding rate of the film F.

Figure 4A:
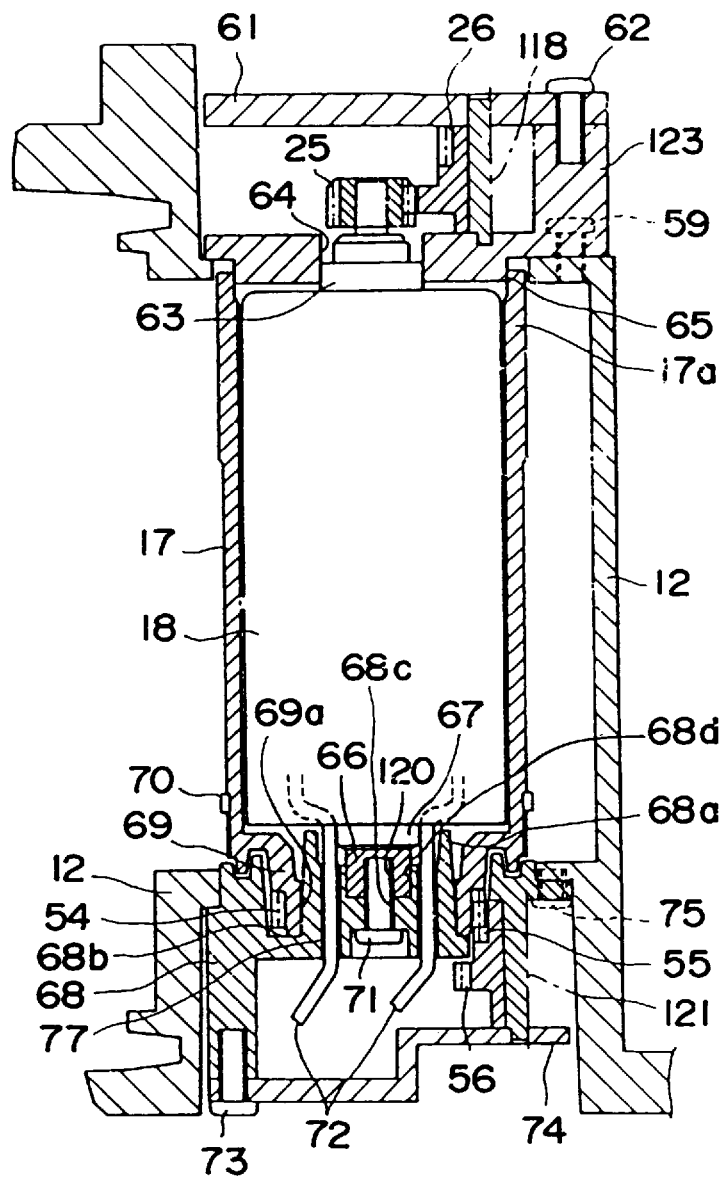
FIG. 4A is a vertical cross-sectional view showing the charge motor supporting structure within a spool.
Figure 4B:
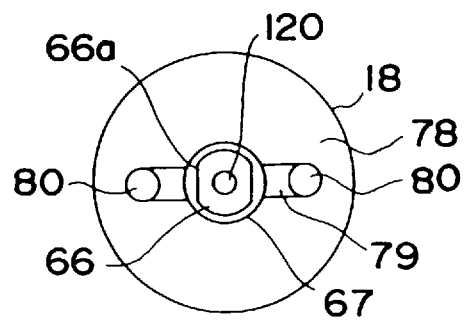
FIG. 4B is a bottom view showing the charge motor housed within the spool.

FIG. 4A is a longitudinal cross-sectional view showing the charge motor 18, which is obtained when seen from the arrow direction B in FIG. 1; and FIG. 4B is a bottom view showing the same. With reference to these drawings, the motor supporting structure will be described in detail hereinbelow.

An upper main plate 123 is fixed to the upper portion of the camera body 12 by a set screw 59. Further, an upper stop plate 61 is fixed to the upper main plate 123 by a set screw 62. The upper main plate 123 is formed with a central locating hole 64 for locating a central projection 63 of the charge motor 18, and with an annular groove 65 for rotatably supporting the cylindrical end of the spool 17 mounted coaxially with the charge motor 18. An axis 118, around which the gear 26 in mesh with the motor gear 25 is rotatable, is provided on the upper main plate 123.

The spool 17 is formed with a lower annular supporting projection portion 69 having the winding gear 54 on the outer circumference thereof and a central hole 69a for taking out leads 72 of the charge motor 18.

The charge motor 18 includes a lower bracket portion 78 (shown in FIG. 4B) formed with a central lead guide portion 67, an oval locating projection portion 66, a pair of lead takeout holes 80, and a pair of radially extending lead guide grooves 79, respectively. The leads 72 taken out through the lead takeout holes 80 are guided along the lead guide grooves 79, and then bent in the axial direction of the motor 18 along the lead guide portion 67 and the oval locating projection portion 66, so that the leads 72 can be securely supported between the central lead guide portion 67 of the charge motor 18 and an annular projection portion 68a (described below) of a lower main plate 68, and then taken out through the lead holes 77 formed in the lower main plate 68 without interference with the rotatable spool 17.

The lower main plate 68 is fixed to the lower portion of the camera body 12 by a set screw 75. Further, a lower stop plate 74 is fixed to the lower main plate 68 by a set screw 73. The lower main plate 68 is formed with an annular recessed portion 68b for rotatably supporting the annular supporting projection portion 69 of the spool 17 from below, an annular projection portion 68a for slidably supporting the annular supporting projection portion 69 thereof from radially inside, and a central locating hole 68d for receiving therein the central oval projection portion 66 of the spool 17. The lower main plate 68 is also formed with a screw hole 68c for passing a set screw 71 screwed into a threaded hole 120 of the oval projection portion 66 of the spool 17 to fix the spool 17 to the lower main plate 68, and two lead guide holes 77 for taking out two motor leads 72 between the annular projection portion 68a and the locating hole 68d.

An axis 121, around which the small gear 55 in mesh with the winding gear 54 fixed to the spool 17 is rotatable, is provided on the lower main plate 68.

Hereinafter, with reference to FIG. 6A, a diaphragm control mechanism for setting the diaphragm to a set diameter will be described. This mechanism roughly comprises a main diaphragm latch lever 87, a solenoid 99, rack and pinion mechanism 105 and 106, and a angular position sensor 108 and 109.

Figure 6A:
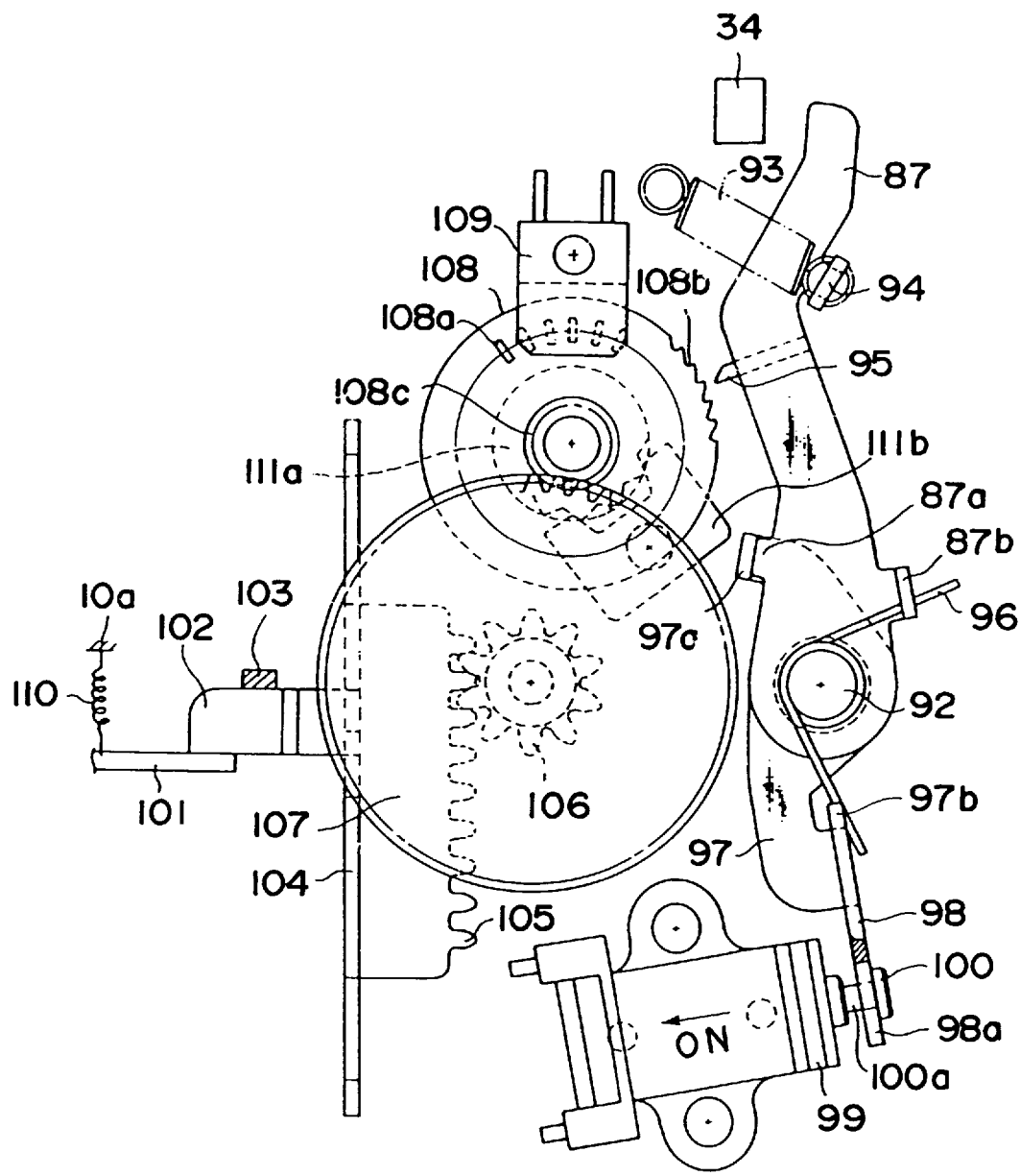

The main diaphragm latch lever 87 shown in FIG. 6A is also shown in FIG. 5A as a small rectangle which is associated with the diaphragm reset lever 34. Namely, the main diaphragm latch lever 87 is located so that one free end thereof can be brought into contact with the diaphragm reset lever 34 (also shown in FIG. 5A) when pivoted counterclockwise around a pivotal axle 92 by an elastic force of a return spring 93 fixed between the camera body 12 and a spring mounting portion 94 of the main diaphragm latch lever 87. Further, the main diaphragm latch lever 87 is formed with a latch claw 95 engageable with ratchet teeth 108b of a pulse plate 108 of the angular position sensor and with a flat projection 87a.

In addition, a subsidiary or auxiliary latch lever 97 is pivotally supported coaxially with the main diaphragm latch lever 87 about the same axis 92. This subsidiary latch lever 97 is formed with a vertical portion 97a engageable with the flat projection 87a at one end thereof and with a linkage lever 98 at the other end thereof.

A coil-shaped coupling spring 96 is mounted around the pivotal axis 92 between a spring catch portion 87b of the main diaphragm latch lever 87 and a spring catch portion 97b of the subsidiary latch lever 97. By the provision of the coil-shaped spring, the main diaphragm latch lever 87 is urged in the counterclockwise direction. Further, as stated above, the flat projection 87a is engaged with the vertical portion 97a of the subsidiary latch lever 97 when rotated in the counterclockwise direction. Therefore, the subsidiary latch lever 97 can be rotated in the counterclockwise direction together with the main diaphragm latch lever 87.

Figure 6B:
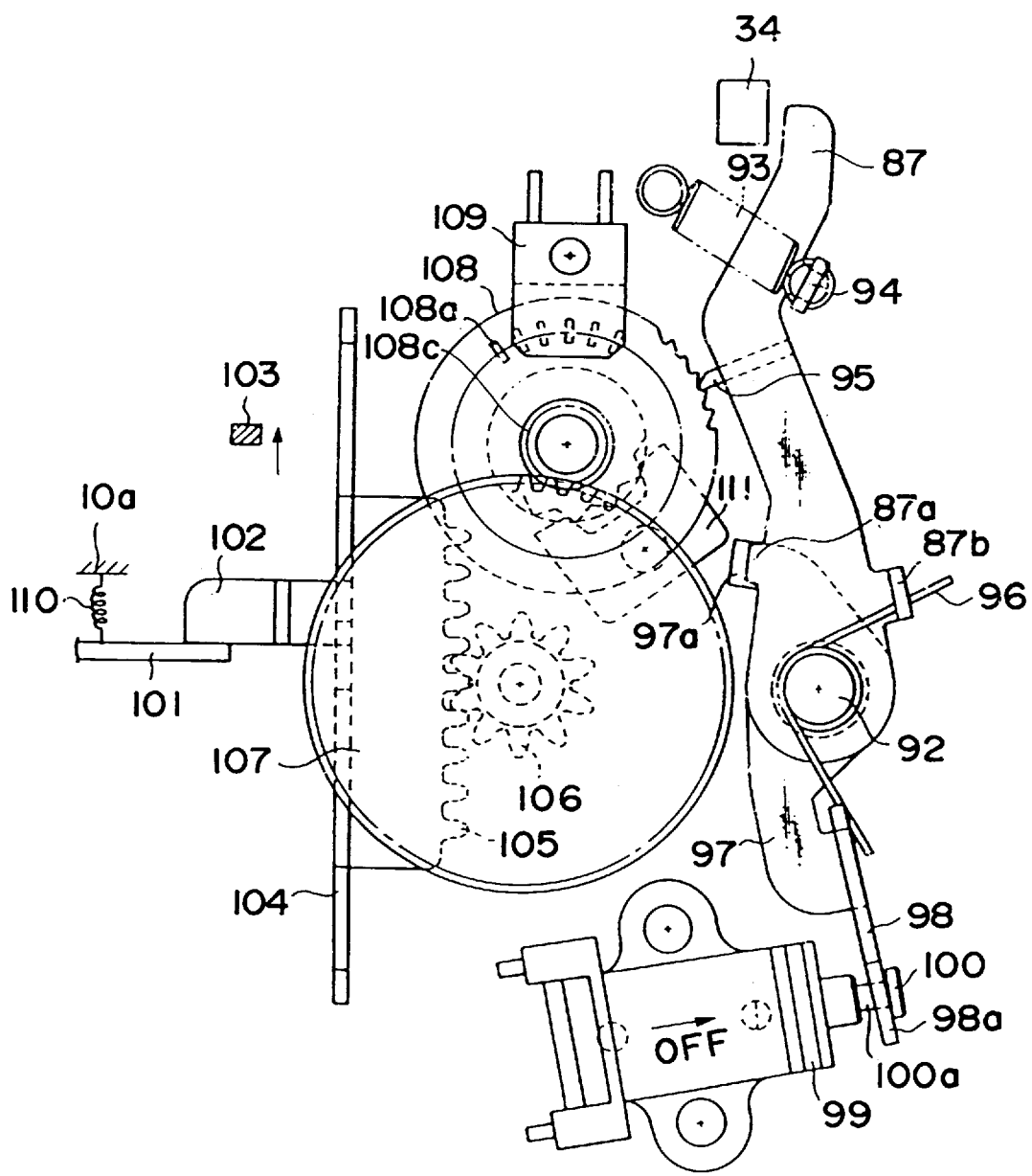
Figure 6C:
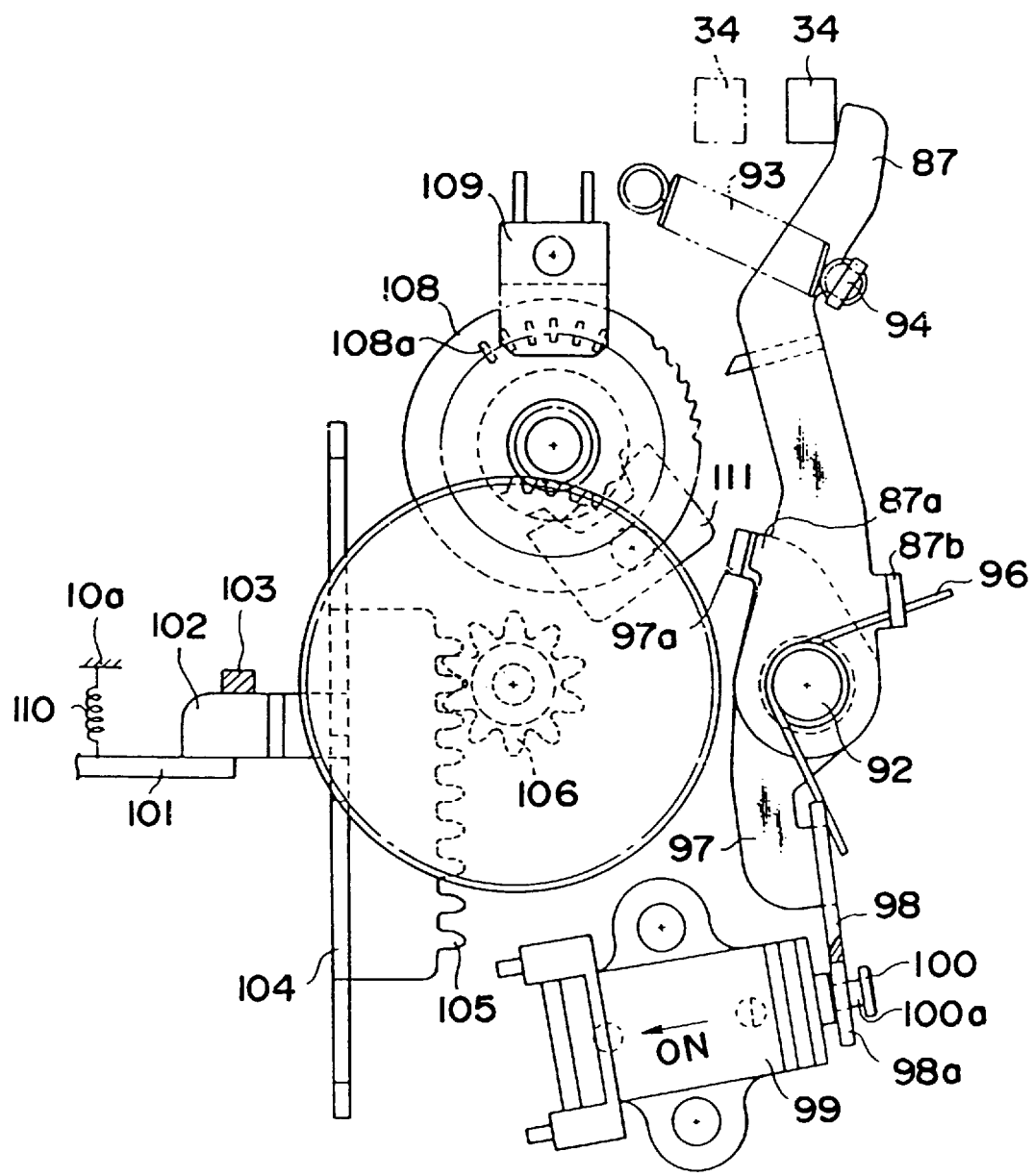

The solenoid 99 disposed near the free end of the subsidiary latch lever 97 includes a plunger 100 formed with a small diameter portion 100a engaged with a cutout portion 98a of the linkage lever 98. Therefore, when the solenoid 99 is energized and then the plunger 100 is attracted into the solenoid 99, both the diaphragm latch lever 87 and the subsidiary latch lever 97 are pivoted clockwise to disengage the ratchet claw 95 from the ratchet teeth 108b of the pulse plate 108, as shown in FIG. 6C. On the other hand, when the solenoid 99 is deenergized, and the plunger 100 is released, both the diaphragm latch lever 87 and the subsidiary latch lever 97 are pivoted counterclockwise by an elastic force of the return spring 93 to engage the ratchet claw 95 with the ratchet teeth 108b of the pulse plate 108, as shown in FIG. 6B.

A rack plate 104 slidably supported in the vertical direction by a supporting mechanism (not shown) is formed with a slide plate 102 and a rack 105. The slide plate 102 is in contact with a lens side diaphragm adjusting lever 101 movable up and down in linkage with a diaphragm of a camera lens (not shown) whenever the camera lens is fitted to the camera body 12. This lens side diaphragm adjusting lever 101 is urged upwardly by an elastic force of a return spring 110 fixed to a camera lens cylinder 10a. Therefore, the rack plate 104 is always urged upwardly by the elastic force of the return spring 110 via the lens side diaphragm adjusting lever 101. Further, a mirror side swing lever 103 is disposed in contact with the slide plate 102.

The rack 105 is in mesh with a small diameter pinion gear 106 fixed to a large diameter gear 107 disposed in close vicinity of the main diaphragm latch lever 87.

The pulse plate 108 rotatably supported near the large diameter gear 107 includes a small diameter gear 108c in mesh with the large diameter gear 107, a ratchet wheel formed with a plurality of the ratchet teeth 108b and a plurality of pulse holes 108a associated with a photointerrupter 109. An escapement mechanism includes an escape wheel or plate 111a engaged with an anchor or lever 111b to render the motion of the pulse plate 108 intermititent. The escapement mechanism 111 is provided with escape wheel 111a for engaging with circumferentially provided notches or teeth in anchor 111b mounted coaxially with pulse plate 108. The anchor 111b includes a pivotedly mounted double armed lever, individual arms of which are alternately and intermittently engaged with spaced notches provided on the escape wheel 111a. The photointerrupter 109 detects the number of rotations of the pulse plate 108 and the angular position thereof by counting the number of light signals passed through the pulse holes 108a formed in the rotating pulse plate 108.

The operation of the single-reflex camera thus constructed will be described hereinbelow with reference to FIGS. 5A to 5C and FIGS. 6A to 6C.

Prior to the detailed description, the operation of the mechanism will be first summarized as follows: (1) before the shutter button is released, the mirror and the shutter have already been charged; (2) when the shutter button is half depressed, light value or exposure value is measured; (3) when the shutter button is full depressed, the mirror is moved upward, the diaphragm is set, and then the shutter is released for light exposure; (4) after the light exposure, the mirror is charged, the shutter is next charged, and the diaphragm is reset open; and thereafter (5) all the mechanisms are initialized.

In more detail, when the film F is wound by one frame and the shutter charge and mirror charge have both been completed prior to the release, the shutter and mirror charge mechanism is in the status as shown in FIG. 5A. That is, the cam gear 32 is located at the angular position as shown in FIG. 5A, so that the shutter charge lever 38 is placed in the initial position in which the roller pin 38b is in contact with the shutter cam 30, and the mirror charge lever 33 is also placed in the initial position in which the roller pin 33a is in contact with the back surface 31c of the mirror cam 31. Further, the shutter side charge lever 91 is located at the shutter charge completion position as shown by solid lines, and the mirror linkage lever 90 is located at the mirror charge completion position as shown by solid lines in FIG. 5A.

Under these conditions, since the mirror charge lever 33 has been fully pivoted counterclockwise, the bifurcate portion 115 of the mirror charge lever 33 also fully the switch board 36a counterclockwise via the linkage pin 112 to the position as shown in FIG. 5, relative to the fixed switch member 36b. In this condition, the two contact brushes 114 are in contact with the two mutually insulated contacts 113a and 113b.

On the other hand, in the diaphragm control mechanism shown in FIG. 6A, the slide plate 102 is held by the mirror side swing lever 103 at the position as shown, so that the lens side diaphragm adjusting lever 101 is held at the position as shown against the return spring 110. Under these conditions, the solenoid 99 is energized to pivot the main diaphragm latch lever 87 clockwise via the linkage lever 98 and the subsidiary latch lever 97, so that the ratchet claw 95 is disengaged from the ratchet teeth 108b to release the pulse plate 108. Therefore, the diaphragm of the camera lens is reset full open.

Under these conditions, when the shutter button is half depressed, photometry starts; that is, exposure value is measured. Thereafter, when the shutter button is depressed, fully the mirror linkage lever 90 shown in FIG. 5A is moved form the mirror-down (charged) solid line position to the mirror-up two-dot chain line position, to bring up the mirror to a position at which a picture can be taken. In this case, since the mirror side swing lever 103 shown in FIG. 6A is simultaneously moved upwardly in linkage with the motion of the mirror linkage lever 90 to the solid line position as shown in FIG. 6B, the lens side diaphragm adjusting lever 101 is also moved upward by the return spring 110 together with the slide plate 102, so that the diameter of the full opened diaphragm starts to be reduced.

That is, when the slide plate 102 is moved upwardly, since the rack 105 is also moved upwardly, the large diameter gear 107 is rotated clockwise by the small diameter gear 106, so that the pulse plate 108 is pivoted counterclockwise by the small diameter gear 108c. At this moment, the diaphragm photointerrupter 109 starts to count the number of light signals passed through the pulse holes 108a of the pulse plate 108 as an angular value corresponding to the change rate of the diaphragm diameter. The counted value is transmitted to a controller (not shown), and compared with a predetermined value, to deenergize the diaphragm solenoid 99 when the counted value matches the predetermined value.

When deenergized, the diaphragm solenoid 99 releases the main diaphragm latch lever 87, so that the latch lever 87 is pivoted counterclockwise by the return spring 93 to engage the ratchet claw 95 with one of the ratchet teeth 108b, as shown in FIG. 6B. Under these conditions, since the pulse plate 108 stops rotating, the slide plate 102 is stopped from further movement. As a result, the lens side diaphragm adjusting lever 101 is stopped at an appropriate position by the slide plate 102 via the rack and pinion mechanism 105 and 106.

Thereafter, the shutter (shutter charge lever 91) is released from the charged solid line position to the released two-dot chain line position shown in FIG. 5A.

After light exposure, when the charge motor 18 rotates in the charge completion direction, the cam gear 32 is further rotated counterclockwise via the pinion gear 25 and the gears 26, 27 and 28, so that the mirror cam 31 pushes the roller pin 33a radially outward along the first cam surface 31a. Therefore, the mirror charge lever 33 pivots clockwise about the pivotal axis 60, so that the mirror linkage lever 90 is moved by the end of the mirror charge lever 33 from the mirror-up two-dot chain line position to the mirror-down (charged) solid line position, as shown in FIG. 5B, to charge the mirror.

In the same way, the shutter cam 30 pushes the roller pin 38b radially outward along the cam surface 30a. Therefore, the shutter charge lever 38 pivots clockwise, so that the shutter side charge lever 91 is moved by the charge pin 38a of the shutter charge lever 38 from the shutter-release two-dot chain line position to the shutter-charge solid line position shown in FIG. 5C, to charge the shutter. Under these conditions, as shown in FIG. 5B, the switch board 36a is pivoted clockwise by the mirror charge lever 33 via the bifurcate arm 115 and the linkage pin 112, so that the contact brushes 114 contacting with the two mutually insulated contacts 113a and 113b are brought into contact with the two mutually connected contacts 113b and 113c.

Figure 5B:
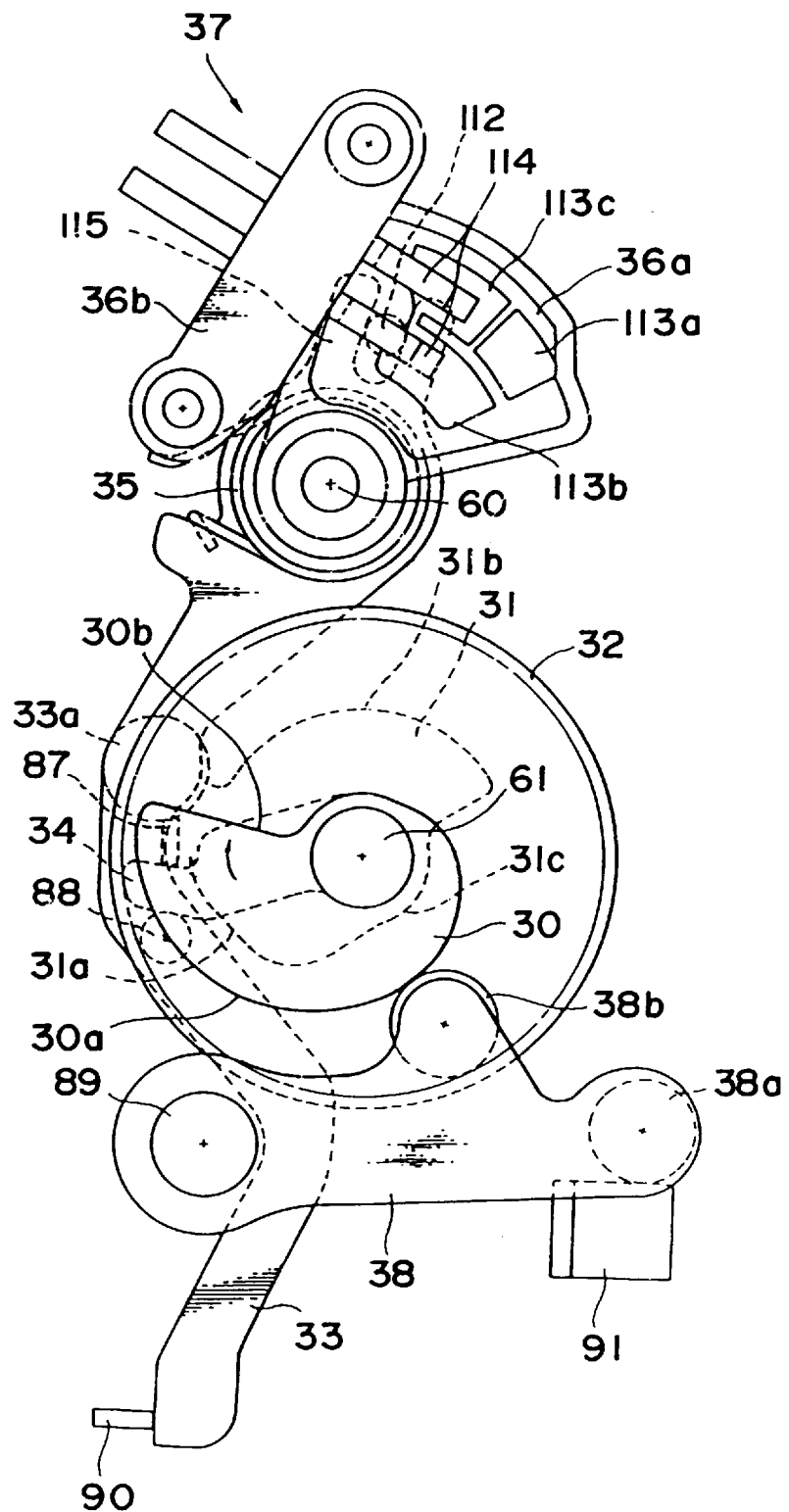
Figure 5C:
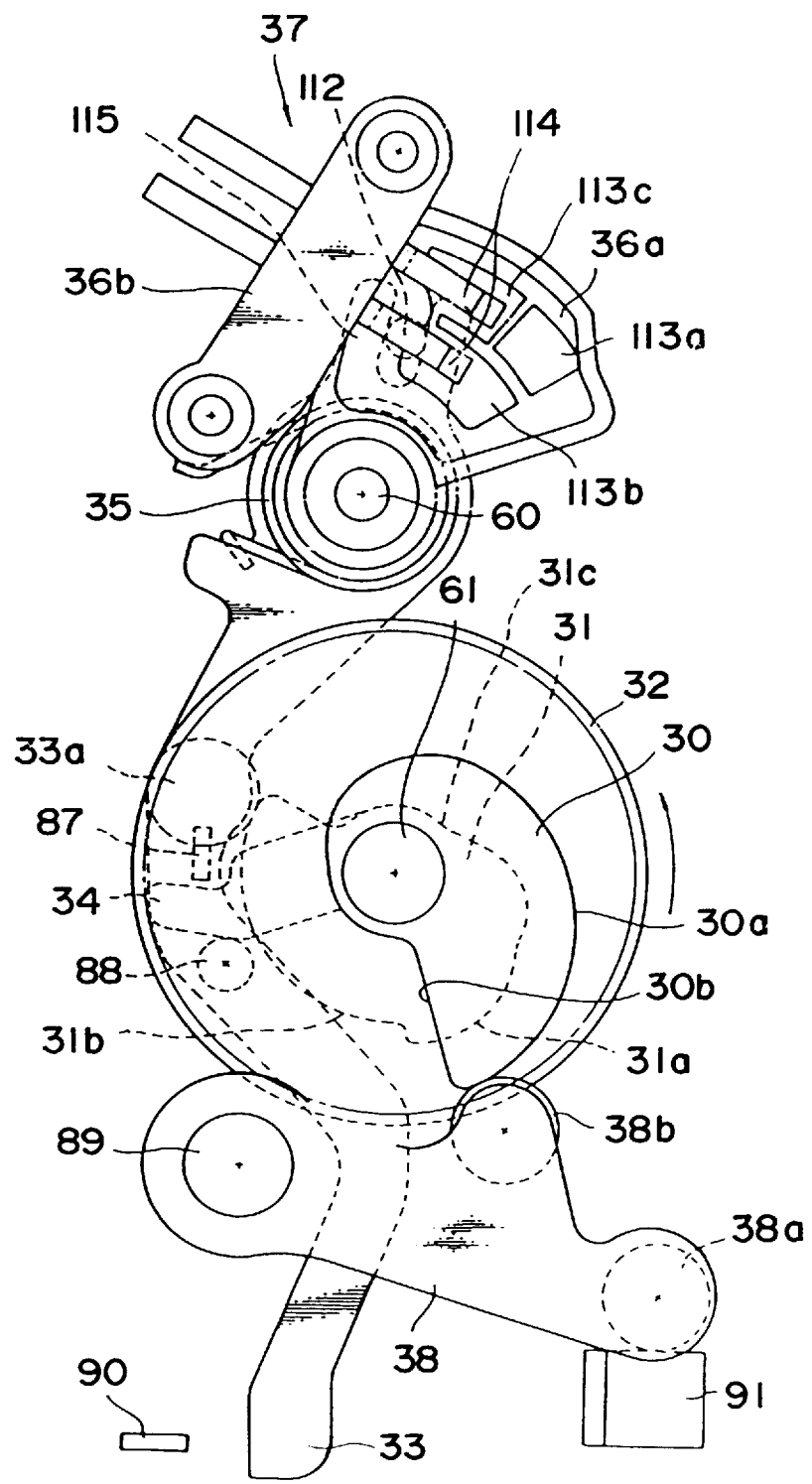

At the same time, since the linkage pin 88 of the mirror charge lever 33 also pivots clockwise, the diaphragm reset lever 34 is pivoted clockwise by the linkage pin 88, as shown in FIG. 5B, so that the main diaphragm latch lever 87 is also moved form the two-dot chain line position to the solid line position shown in FIG. 6C, against the return spring 93.

When the cam gear 32 is further pivoted counterclockwise from the position shown in FIG. 5B, the shutter charge lever 38 is further pivoted clockwise via the roller pin 38b by the cam surface 30a whose diameter increases successively in the clockwise direction, so that the shutter charge lever 91 is moved by the charge pin 38a to the shutter charge completion position as shown by solid lines in FIG. 5C.

Further, after the mirror charge lever 33 has been pivoted clockwise by the first cam surface 31a of the mirror cam 31 to shift the mirror linkage lever 90 to the complete mirror charge position as shown in FIG. 5B, since the roller pin 33a in contact with the mirror cam 31 is shifted from the first cam surface 31a to the second cam surface 31b, the free end of the mirror charge lever 33 moves back away from the mirror linkage lever 90, as shown in FIG. 5C.

In this case, since the linkage pin 88 of the mirror charge lever 33 is also pivoted counterclockwise, the diaphragm reset lever 34 is also pivoted counterclockwise by a return spring (not shown) so as to be moved away form the main diaphragm latch lever 87 to the two-dot chain line position shown in FIG. 6C. At this moment, the solenoid 99 is energized to attract the plunger 100 toward a permanent magnet disposed in the solenoid 99, so that the main diaphragm latch lever 87 is pivoted clockwise against the return spring 93 to the diaphragm reset position shown in FIG. 6A.

When the cam gear 32 is further rotated form the position shown in FIG. 5C, the mirror charge lever 33 is released from the second cam surface 31b. As a result, the roller pin 33a is brought into contact with the back surface 31c of the cam 31. At the same time, the roller pin 38b of the shutter charge lever 38 is released from the cam surface 30a comes into contact with the shutter cam 30 along the back surface 30b. Therefore, since the mirror charge lever 33 is pivoted counterclockwise, the switch board 36a is also pivoted counterclockwise by the engagement between the bifurcated arm 115 and the linkage pin 112, so that the contact brushes 114 in contact with the mutually connected contacts 113b and 113c are brought into contact with the two mutually insulated contacts 113b and 113a. In other words, since the rotary switch 37 can detect one revolution of the cam gear 32, and outputs a detection signal to a controller (not shown), the charge motor 18 is stopped form rotating and therefore the shutter and mirror charge mechanism is returned to the initial position, as shown in FIG. 5A.

On the other hand, after the shutter release has been completed, the controller supplies a signal to the film motor 19 to drive the film motor 19 in the counterclockwise direction, that is the film winding direction. Then, the planetary lever 42 is pivoted counterclockwise by the sun gear 41 rotating counterclockwise via the planetary gear 43, so that the planetary gear 43 is brought into mesh with the large diameter gear 56, to rotate the spool 17 in the counterclockwise film winding direction via the small diameter gear 55 and the winding gear 54, all as shown in FIG. 3. Once the film F is wound, the number of rotations of the rotary plate 57 engaged with the sprocket 22 is counted by the photointerrupter 58. In response to the count signal, the film motor 19 is stopped at the time when the film F has been wound by one frame.

After all the frames of the film F have been exposed, a rewinding switch (not shown) is turned on. In response to a rewinding signal, the film motor 19 is rotated in the clockwise direction, that is the film rewinding direction. Then, the planetary lever 42 is pivoted clockwise by the small diameter gear 41a rotating clockwise, so that the planetary gear 43 is brought into mesh with the large diameter gear 44, to rotate the rewinding fork 53 in the clockwise film rewinding direction via the rewinding reduction gear train 49, the through shaft gears 48 and 51, and the rewinding gear 52, all as shown in FIG. 3. As a result, the exposed film F is rewound into a film cartridge positioned on the opposite side form the spool 17.

In the above-mentioned embodiment, the charge motor 18 is disposed coaxially with the spool 17. Without being limited thereto, however, it is possible to dispose the charge motor 18 outside the spool 17. Further, in the above description, the present invention has been applied to a single-lens reflex camera. Without being limited thereto, however, the present invention can be applied to any cameras provided with a built-in strobe other than the single-lens reflex camera.

As described above, in the camera provided with a strobe according to the present invention, since the circuit board for the strobe circuit is formed into a substantially L-shaped configuration having a cutout portion and the motor is positioned in this cutout portion of the circuit board, it is possible to effectively utilize a small space within the camera by combining the motor and the strobe circuit board in the three-dimensional space, thus minimizing the shape of the camera provided with a strobe. In particular, since the size and the configuration of the cutout portion of the strobe circuit board is designed such that the motor is disposed therein, the combination of the strobe circuit board and the motor provides a substantially box-shaped configuration as a whole, thus enabling them to be accommodated in the limited small space within the camera grip of the camera body.

In this regard, it should be noted that in a camera provided with a strobe currently available there are many complicated mechanisms, such as a shutter and mirror charge mechanism and a diaphragm control mechanism and the like as stated above, and they have to be incorporated into a limited small space within the camera.

Further, as stated in the above, the arrangement between the motor and the strobe circuit board is restricted in view of the requirement of suppressing the unfavorable noise generation. The arrangement of the motor and the strobe circuit board according to the present invention can satisfy these requirements.

Finally, it should also be noted that the present disclosure relates to subject matter contained in Japanese patent application No. 3-308605 filed on Sep. 12, 1991 which is expressly incorporated herein by reference in its entirety.

The disclosure of the present application is related to copending, concurrently filed applications U.S. Ser. No. 07/944,277 and 07/944,317. (Attorney Docket Nos. P11124 and P11230), the disclosures of which are hereby expressly incorporated herein by reference in their entireties.

What is claimed is:

1. A camera provided with a built-in strobe, said camera comprising:

a camera body within which elongated space is defined;

a film winding and rewinding motor provided within said camera body, a length dimension of said motor extending in a direction of elongation of said elongated space;

a strobe circuit board provided within said camera body, said strobe circuit board being formed into a generally L-shape with a cutout portion defining said L-shape, said strobe circuit board and said motor being accommodated within said elongated space, such that said motor is positioned to extend into said cutout portion of said strobe circuit board.

2. A camera provided with a built-in strobe as claimed in claim 1, wherein said cutout portion of said strobe circuit board has length and width dimensions such that a substantial portion of a length and width of said motor can be received therein.

3. A camera provided with a built-in strobe, said camera comprising:

a camera body having two side portions;

a camera grip integrally formed with said camera body at one said side portion of said camera body, said camera grip including a battery, a film spool and a main strobe capacitor received within said camera grip, said camera grip defining an elongated space, a direction of elongation of said elongated space extending along a longitudinal dimension of said camera grip, said elongated space being substantially surrounded by said battery, said film spool and said main strobe capacitor;

a film winding and rewinding motor provided within said elongated space in said camera grip, said motor having a rotary output shaft extending in said longitudinal direction; and an elongated strobe circuit board received within said elongated space together with said film winding and rewinding motor, said strobe circuit board being formed into a general L-shape with a cutout portion defining said L-shape, said film winding and rewinding motor being received within said L-shape, said rotary output shaft of said motor extends along a longitudinal dimension of said strobe circuit board.

4. The camera provided with a built-in strobe as claimed in claim 3, wherein said film winding and rewinding motor together with said rotary output shaft having a predetermined axial length, a length of said cutout portion along the longitudinal dimension of said strobe circuit board being substantially the same as said predetermined axial length of said film winding and rewinding motor and rotary output shaft.

5. The camera provided with a built-in strobe as claimed in claim 4, said strobe circuit board including strobe circuit elements, said strobe circuit elements arranged on said strobe circuit board along a direction of said longitudinal dimension.

6. The camera provided with a built-in strobe as claimed in claim 5, wherein said rotary output shaft of said film winding and rewinding motor, said battery, said film spool, and said main strobe capacitor are all arranged such that major longitudinal dimensions of each extend substantially parallel within said camera grip.

7. The camera provided with a built-in strobe according to claim 3, said camera grip comprising an integral contiguous portion of said camera body.

8. The camera provided with a built-in strobe according to claim 3, said output shaft of said film winding and rewinding motor provided with a gear, said gear meshing with a gear train for transmitting motion of said film winding and rewinding motor to a film received within said camera.

9. The camera provided with a built-in strobe according to claim 1, further comprising a film spool and a camera battery positioned about said elongated space within a housing of the camera body within which said elongated space is defined.

10. The camera provided with a built-in strobe according to claim 1, said camera including a film spool having a longitudinal axis, the direction of elongation of said elongated space extending along the longitudinal axis of said film spool.

11. The camera provided with a built-in strobe according to claim 10, said film winding and rewinding motor provided with a rotatable output shaft, said output shaft being rotatable about an axis parallel to the longitudinal axis of said spool.

12. The camera provided with a built-in strobe according to claim 11, said camera body further defining spaces for a camera battery, a strobe capacitor, and a film spool.

13. The camera provided with a built-in strobe, said camera comprising:

a camera body comprising a receiving space for camera components, said camera body adapted to receive a film spool;

a film winding and rewinding motor provided in said camera body, said motor having a rotary output shaft, said rotary output shaft having an axis of rotation, said axis of rotation extending substantially parallel to an axis of rotation of said film spool; and a strobe circuit board provided within said camera body, said strobe circuit board being formed with a notch therein, said motor being nested within said notch so as to be accommodated within said camera body, said strobe circuit board and said motor being accommodated within a single space within said camera body.

* * * * *